(12) United States Patent
Engel

(10) Patent No.: US 6,405,526 B1
(45) Date of Patent: Jun. 18, 2002

(54) SOLID FUEL PROPULSION SYSTEM FOR A RAM JET ROCKET

(75) Inventor: Herbert Engel, Bruckmuhl (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/584,114

(22) Filed: May 31, 2000

(30) Foreign Application Priority Data

May 31, 1999 (DE) .......................................... 199 24 907

(51) Int. Cl.[7] ................................................. F02K 7/10
(52) U.S. Cl. ............................. 60/245; 60/251; 60/253; 60/270.1
(58) Field of Search .......................... 60/251, 245, 253, 60/270.1

(56) References Cited

U.S. PATENT DOCUMENTS 5,172,547 A * 12/1992 Lawrence ..................... 60/234

FOREIGN PATENT DOCUMENTS

| DE | 85321486 | 5/1986 |
|---|---|---|
| GB | 1184819 | 8/1967 |

* cited by examiner

Primary Examiner—Charles G. Freay
Assistant Examiner—Ehud Gartenberg
(74) Attorney, Agent, or Firm—Ladas & Parry

(57) ABSTRACT

A solid fuel propulsion system for a ran jet rocket having a combustion chamber (B) surrounded by a tubular casing (2) and a gas generator (G) disposed upstream from the combustion chamber (B) and surrounded by a tubular casing (1) for generation of a combustible gas from a solid fuel, disposed between the gas generator (G) and the combustion chamber (B) is a gas-stream regulator unit (R) for regulation of the flow of the combustible gas from the gas generator (G) to the combustion chamber (B). The propulsion system has a middle section (4) in which the gas stream regulator unit (R) is housed. The middle section is connected in a load-bearing manner with the combustion chamber casing (2) and the gas generator casing (1) and is provided with a first pressure head (8) sealing the gas generator (G), and a second pressure head (9) sealing the combustion chamber (B). Disposed between the pressure heads (8, 9) is a base unit which houses the gas stream regulator unit (R) and braces the pressure heads (8, 9).

25 Claims, 1 Drawing Sheet

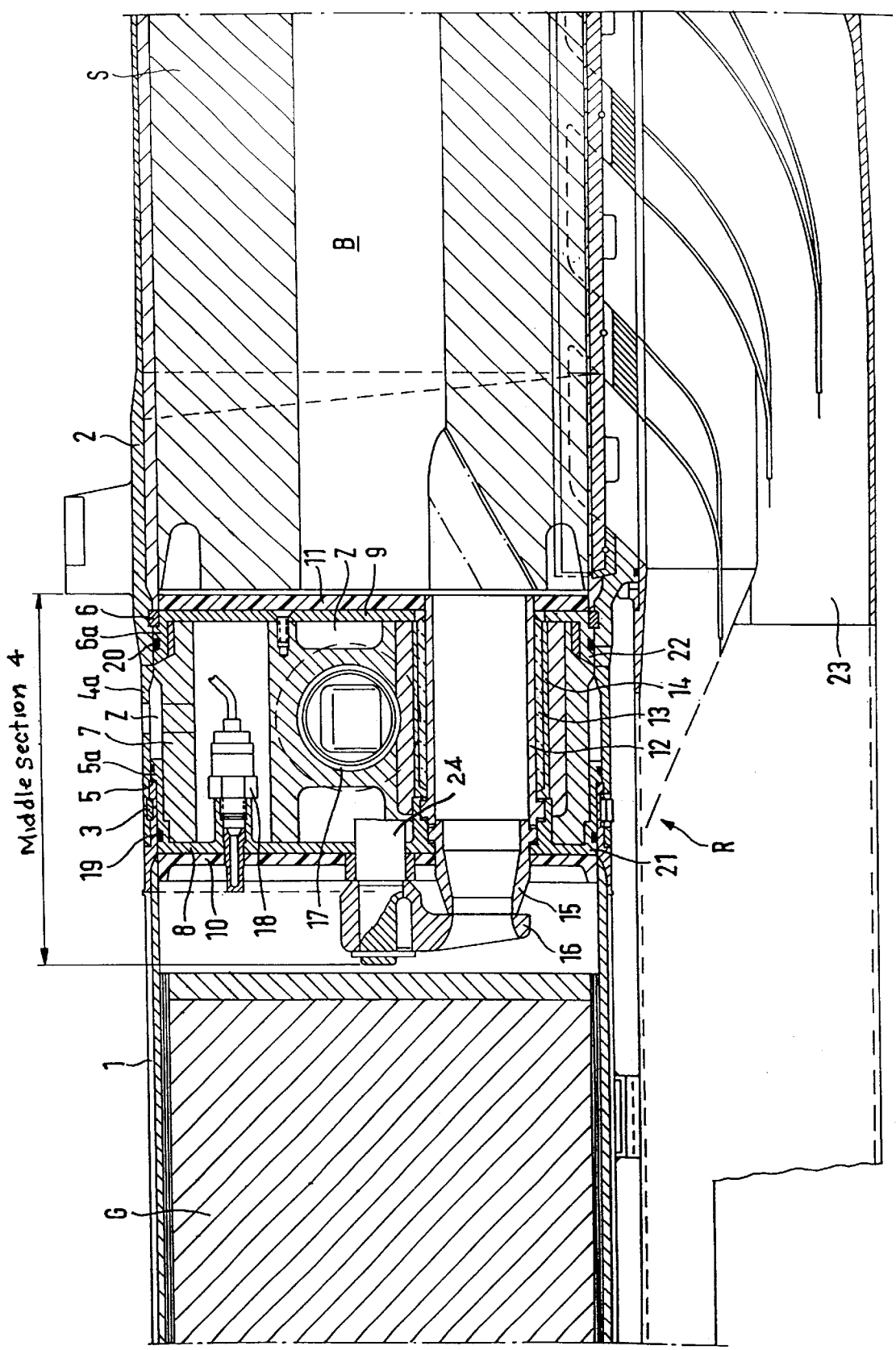

SOLID FUEL PROPULSION SYSTEM FOR A RAM JET ROCKET

FIELD OF THE INVENTION

The invention relates to a solid fuel propulsion system for a ram jet rocket.

BACKGROUND

Solid fuel propulsion systems for ram jet rockets are known which are provided with a combustion chamber having a tubular casing and a gas generator disposed upstream from the combustion chamber for generation of a combustible gas from a solid fuel. The gas generator is surrounded by a tubular casing. A gas-stream regulator unit for regulation of the flow of the combustible gas from the gas generator to the combustion chamber is disposed between the gas generator and the combustion chamber.

In these known solid fuel propulsion systems, the gas generator and the combustion chamber are each formed as closed pressure vessels with elliptically dished heads. The gas stream regulator unit is disposed between the gas generator and the combustion chamber and in the event of deformation of the pressure heads of the gas generator and the combustion chamber due to internal pressure and heat during operation of the propulsion system, the function of the gas flow regulator unit is adversely influenced.

SUMMARY OF THE INVENTION

An object of the invention is to provide a solid fuel propulsion system for a ram jet rocket which is reliable in operation of the gas flow regulator unit.

This and further objects are achieved by a solid fuel propulsion system according to the invention, which comprises a combustion chamber having an outer tubular casing, a gas generator disposed downstream of said combustion chamber for generating a combustible gas from a solid fuel in said gas generator, said gas generator having an outer tubular casing, and gas flow regulator disposed between said combustion chamber and said gas generator for regulating a stream of combustion gas from said gas generator to said combustion chamber, a middle section being secured between said gas generator and said combustion chamber and supporting said gas flow regulator therein. Load resisting connections secure said middle section to said tubular casings of said gas generator and said combustion chamber, said middle section having a first pressure head sealing the combustion chamber from the middle section and a second pressure head sealing the gas generator from the middle section. The middle section has a base unit engaged between said pressure heads and braces said pressure heads, the gas flow regulator being housed in the base unit.

According to one embodiment of the invention, the middle section is surrounded by a tubular casing portion.

Preferably, the casing portion forms a part of the structure joining the casings of the gas generator and the combustion chamber.

Preferably, the casing of the gas generator, the casing portion of the middle section and the casing of the combustion chamber have substantially the same diameter.

According to the preferred embodiment of the invention, it is provided that the casings of the gas generator, combustion chamber and middle section are stepped annularly at their adjoining ends and are pushed one into the other and tightly interfitted by the load resistant connections.

In this embodiment, the load resistant connections between the casings is preferably formed by a coil spring system tightly embracing the engaged ends of the casings.

The casings of the gas generator and the combustion chamber which are pushed one into the other at their ends advantageously form the casing portion of the middle section and they are securely coupled together by the load resistant connection. In this case, the middle section between the casings of the gas generator and the combustion chamber is preferably positioned in an axial direction by shoulder rings interlocking therewith.

According to another preferred embodiment of the invention, the base unit of the middle section is formed as an annular member, and the pressure heads are formed as annular caps of U-shape mounted on the annular member. The U-shape of the caps forms cylindrical rims constituting reinforcements for the caps.

In the aforesaid embodiment, it is preferable that the casings of the gas generator and the combustion chamber have an annularly stepped configuration and are pushed one into the other and secured by a load-resisting connection. The interfitted casings form a tubular casing portion surrounding the middle section, and shoulder rings are provided on the casings of the gas generator and the combustion chamber to brace and secure the middle section in the longitudinal direction. In an improvement, the shoulder rings on the casings of the gas generator and the combustion chamber are engaged against shoulders formed on the annular caps of the middle section.

Preferably, circumferential sealing rings forming a hermetic seal are disposed between the outer cylindrical rims of the annular caps and the casings of the combustion chamber and the gas generator.

According to a highly advantageous improvement of the invention, heat shields are provided on the pressure heads to protect them against thermal effects. These heat shields are preferably made of thermally ablative material, such as a silicone-base material.

Preferably, the base unit is made of a lightweight metal, especially aluminum, or of a high-strength ceramic, especially reinforced with carbon fibers.

The pressure heads are preferably made of steel or high-strength ceramic, preferably reinforced with carbon fibers.

According to another preferred improvement of the invention, a means for active cooling is provided by using he heat of evaporation of a liquid, such as water, said means being provided in the base unit and/or on the pressure heads.

According to another embodiment of the invention, a gas guide is provided in the middle section and extends in the longitudinal direction of the propulsion system, preferably parallel to the axis thereof, to provide for passage of the gas flow from the gas generator to the combustion chamber. The gas guide is preferably made of molybdenum.

According to another improvement of the invention, the gas guide is surrounded by an insulating jacket to prevent heat transfer with the interior of the middle section. The prevention of heat transfer can be improved by disposing the insulating jacket between the outer circumference of the gas guide and a steel liner surrounding the insulating jacket. Advantageously, the gas-stream regulator unit contains a final control clement which regulates the mass flow of the gas stream through the gas guide.

According to another embodiment of the invention, the gas stream regulator unit contains an actuator, which is mounted in the base unit of the middle section and which is coupled to the final control element said final control element being disposed outside the base unit and cooperating with a regulator nozzle provided at an end of the gas guide for the purpose of regulating the gas stream through the gas guide.

According to another improvement of the invention, the middle section contains a pressure neutral zone, which is sealed from the gas generator and the combustion chamber by sealing elements, and through which measuring and supply lines pass into the interior of the base unit.

Advantageously, the pressure neutral zone is defined by the sealing rings disposed between the annular caps and the casings of the combustion chamber and the gas generator.

Advantageously, the middle section is constructed as a module which is a self-contained functional unit.

BRIEF DESCRIPTION OF THE DRAWING

The sole FIGURE of the drawing is a cross section through a part of a solid fuel propulsion system for a ram jet rocket according to a preferred embodiment of the invention.

DETAILED DESCRIPTION

The cross-sectional view of a solid fuel propulsion system for a ram jet in the drawing illustrates a combustion chamber B surrounded by a tubular casing 2 and a gas generator G disposed upstream from combustion chamber B and surrounded by a tubular casing 1. In combustion chamber B, there is disposed a starter fuel S, with which combustion chamber B is initially operated to start the propulsion system. In gas generator G there is disposed a solid fuel, which is used to generate a combustion gas which, after starter fuel S has burned off, is fed to combustion chamber B, where it is burned together with ambient air supplied by air inlets 23. Between gas generator G and combustion chamber B there is disposed a gas stream regulator unit R for regulation of the flow of combustible gas from gas generator G to combustion chamber B.

The gas stream regulator unit R, comprises a gas guide 12 forming a flow path between gas generator G and combustion chamber B, a regulator nozzle 15 disposed on gas guide 12 at the end thereof adjacent to gas generator G, a final control element 16 cooperating with regulator nozzle 15 for regulating the mass flow of the gas stream through gas guide 12, and an actuator 17 operatively coupled to final control element 16. The actuator 17 is mounted in a middle section 4, which is disposed between gas generator G and combustion chamber B. Actuator 17 is controlled as a function of externally supplied data and by a signal generated by a pressure sensor 18 which measures the pressure prevailing in gas generator G.

Middle section 4 is secured in a load-resisting manner with casings 1 and 2 of gas generator G and combustion chamber B respectively. The middle section 4 comprises a first pressure head 8 sealing the middle section from gas generator G, a second pressure head 9 sealing the middle section from combustion chamber B and a base unit 7 secured between the two pressure heads 8, 9 and supporting the gas stream regulator unit R. The base unit 7 forms a rigid support for pressure heads 8, 9 so that they will not be deformed due to the pressures and the resulting high temperatures prevailing in gas generator G and in combustion chamber B during operation, and thus ensuring reliable operation of gas stream regulator unit R.

Middle section 4 is surrounded by a tubular casing portion 4a, which is joined with casing 1 of gas generator G and casing 2 of combustion chamber B. Casing 1, casing portion 4a and casing 2 have substantially the same diameter. Casings 1, 2 and casing portion 4a have adjoining ends which are annularly stepped so that the adjoining ends can be securely interfitted in one another by pushing one end into the other. The interfitted ends are firmly secured to one another to form a load resisting connection by a coil spring system 3 engaging the interfitted casing ends and applying pressure thereto. Casing portion 4a of middle section 4 is preferably formed by casings 1, 2 of gas generator G and combustion chamber B, which are pushed one into the other at their ends. Middle section 4 is positioned in the axial direction between casings 1, 2 of the gas generator and combustion chamber, by shoulder rings 5, 6 which engage against shoulders formed on casings 1 and 2.

Base unit 7 of middle section 4 is formed as an annular member, and pressure heads 8, 9 are formed as annular caps of U-shaped cross-section, the legs of the caps constituting cylindrical rim reinforcements 21, 22. The caps are pressed onto the ends of the annular member of the base unit 7. Shoulders 5a, 6a are formed on caps 8, 9 to engage and brace shoulder rings 5, 6 of gas generator G and combustion chamber B. Between cylindrical rim reinforcements 21, 22 of the annular caps and casings 1, 2 of the combustion chamber and the gas generator circumferential sealing rings 19, 20 are disposed to form a hermetic seal and define a pressure-neutral zone Z in the middle section through which measuring and supply lines are passed into the interior of base unit 7.

Heat shields 10, 11 of silicone-base thermally ablative material are provided on pressure heads 8, 9 for protection against thermal effects from the gas generator and combustion chamber. Base unit 7 is made of a material of low density and high specific heat, preferably a lightweight metal, especially aluminum, or of high-strength ceramic, especially reinforced with carbon fibers (Which requires additional active cooling).

Pressure heads 8, 9 are made of steel or of high-strength ceramic, preferably reinforced with carbon fibers.

Additional means for active cooling by using the heat of evaporation of a liquid, such as water, can be provided in base unit 7 and/or on pressure heads 8, 9.

Gas guide 12 through which the combustible gas is fed from gas generator G to combustion chamber B is oriented in the longitudinal direction of the propulsion system, its axis being substantially parallel to the axis of the propulsion system. Gas guide 12 is made of molybdenum, but alternatively it can also be made of fiber-reinforced ceramic. To ensure that the interior of middle section 4 is protected from the heat of the combustible gas flowing through gas guide 12, an insulating jacket 13, is mounted on the outer surface of gas guide 12 and in turn is enclosed by a steel liner 14.

The final control element cooperating with regulator nozzle 15 on the end of gas guide 12 is disposed outside base unit 7 and is coupled to actuator 17 mounted inside base unit 7 by means of a shaft 24 which extends through first pressure head 8, adjacent to the gas generator. The arrangement of the base unit 7, the two pressure heads 8, 9 and the components disposed inside the base unit 7, such as the gas stream regulator unit R and pressure sensor 18, constitutes a self-contained functional unit in the form of a module, which is joined to the casings 1, 2 of the combustion chamber and the gas generator during assembly of the solid fuel propulsion system.

Although the invention is disclosed with reference to a particular embodiment thereof, it will become apparent to those skilled in the art that numerous modifications and variations can be made which will fall within the scope and spirit of the invention as defined by the attached claims.

What is claimed is:

1. A solid fuel propulsion system for a ram jet rocket comprising:

a combustion chamber having an outer tubular casing, a gas generator disposed downstream of said combustion chamber for generating a combustible gas from a solid fuel in said gas generator, said gas generator having an outer tubular casing, a gas flow regulator disposed between said combustion chamber and said gas generator for regulating a stream of combustible gas from said gas generator to said combustion chamber, a middle section secured between said gas generator and said combustion chamber and supporting said gas flow regulator therein, and load resisting connections securing said middle section to said tubular casings of said gas generator and said combustion chamber to form a secure assembly thereof, said middle section comprising a first pressure head sealing the middle section from the combustion chamber, a second pressure head sealing the middle section from the gas generator and a base unit engaged and braced between said pressure heads, said gas flow regulator being housed in said base unit, said middle section having a pressure-neutral zone, which is sealed from the gas generator and the combustion chamber, and through which measuring and supply lines pass into said base unit, said pressure-neutral zone being defined by scaling rings disposed between the pressure heads and the casings of the combustion chamber and the gas generator.

2. A solid fuel propulsion unit as claimed in claim 1, wherein said middle section includes a tubular outer casing portion.

3. A solid fuel propulsion unit as claimed in claim 2, wherein said outer casing portion of the middle section is secured to said outer casings of the gas generator and the combustion chamber by said load resisting connections.

4. A solid fuel propulsion unit as claimed in claim 3, wherein said outer casing of the gas generator, said outer casing portion of the middle section and said outer casing of the combustion chamber have substantially the same diameter.

5. A solid fuel propulsion unit as claimed in claim 3, wherein said outer casing portion of said middle section has ends connected to opposed ends of said outer casings of said gas generator and said combustion chamber, said opposed ends of adjacent casings being stepped in diameter to interfit tightly.

6. A solid fuel propulsion unit as claimed in claim 5, wherein said load resisting connection comprises a coil spring engaged with the interfit casing ends.

7. A solid fuel propulsion unit as claimed in claim 1, wherein said casings of said gas generator and said combustion chamber are interfitted in one another and form said casing portion of said middle section.

8. A solid fuel propulsion unit as claimed in claim 7, comprising shoulder rings for positioning the middle section axially between said casings.

9. A solid fuel propulsion unit as claimed in claim 2, wherein said base unit comprises an annular member, said pressure heads comprising annular caps of U-shaped cross-section mounted on said annular member.

10. A solid fuel propulsion unit as claimed in claim 9, wherein said casings of said gas generator and said combustion chamber are interfitted with one another and connected by said load resisting connections and form said casing portion surrounding said middle section, and shoulder rings provided on said casings to brace and fix the middle section in a longitudinal direction.

11. A solid fuel propulsion unit as claimed in claim 10, wherein said annular caps of said pressure heads have shoulders against which said shoulder rings are engaged.

12. A solid fuel propulsion unit as claimed in claim 9, wherein said sealing rings are disposed between said caps and said casings of the combustion chamber and gas generator.

13. A solid fuel propulsion unit as claimed in claim 2, comprising heat shields on said pressure heads to protect said heads against thermal effects.

14. A solid fuel propulsion unit as claimed in claim 13, wherein said heat shields are made of thermally ablative material.

15. A solid fuel propulsion unit as claimed in claim 14, wherein said ablative material is a silicone-base material.

16. A solid fuel propulsion unit as claimed in claim 1, wherein said base unit is made of a material which has low density and high specific heat.

17. A solid fuel propulsion unit as claimed in claim 16, wherein said base unit is made of a lightweight metal.

18. A solid fuel propulsion unit as claimed in claim 16, wherein said base unit is made of aluminum or high strength ceramic.

19. A solid fuel propulsion unit as claimed in claim 18, wherein said high strength ceramic is reinforced with carbon fibers.

20. A solid fuel propulsion unit as claimed in claim 2, wherein said pressure heads are made of steel or high strength ceramic.

21. A solid fuel propulsion unit as claimed in claim 1, wherein said basic unit includes a gas guide for flow of the combustible gas from the gas generator to the combustion chamber, said gas guide extending longitudinally between said gas generator and said combustion chamber.

22. A solid fuel propulsion unit as claimed in claim 21, wherein said gas guide is made of molybdenum or a fiber-reinforced ceramic.

23. A solid fuel propulsion unit as claimed in claim 21, comprising an insulating jacket on said gas guide to form a heat shield against heat in an interior of said middle section.

24. A solid fuel propulsion unit as claimed in claim 23, comprising a steel liner surrounding said gas guide, said insulating jacket being disposed between said gas guide and said steel liner.

25. A solid fuel propulsion unit as claimed in claim 1, wherein said middle section is constituted as a self-contained module, said module being secured to said casings by interfitting said casings together with said module and sealing the sealing rings to seal between said pressure heads and said casings.

* * * * *